United States Patent
Wilhelm

(10) Patent No.: US 12,367,608 B2
(45) Date of Patent: Jul. 22, 2025

(54) DETERMINATION OF GAZE DIRECTION

(71) Applicant: Smart Eye AB, Gothenburg (SE)

(72) Inventor: Torsten Wilhelm, Gothenburg (SE)

(73) Assignee: Smart Eye AB, Gothenburg (SE)

( * ) Notice: Subject to any disclaimer, the term of this patent is extended or adjusted under 35 U.S.C. 154(b) by 504 days.

(21) Appl. No.: 17/640,437

(22) PCT Filed: Sep. 3, 2020

(86) PCT No.: PCT/EP2020/074655
§ 371 (c)(1),
(2) Date: Mar. 4, 2022

(87) PCT Pub. No.: WO2021/043931
PCT Pub. Date: Mar. 11, 2021

(65) Prior Publication Data
US 2022/0335648 A1 Oct. 20, 2022

(30) Foreign Application Priority Data

Sep. 5, 2019 (EP) ..................................... 19195512

(51) Int. Cl.
*G06V 40/16* (2022.01)
*G06T 7/73* (2017.01)
(Continued)

(52) U.S. Cl.
CPC .............. *G06T 7/74* (2017.01); *G06V 40/166* (2022.01); *G06V 40/193* (2022.01); *G06T 2207/30201* (2013.01); *G06V 10/30* (2022.01)

(58) Field of Classification Search
CPC .. G06F 2203/0381; G06F 3/012; G06F 3/013; G06T 2207/30201; G06T 7/74; G06V 10/30; G06V 40/166; G06V 40/193
See application file for complete search history.

(56) References Cited

U.S. PATENT DOCUMENTS

| 6,154,559 A | 11/2000 | Beardsley |
| 7,742,623 B1 * | 6/2010 | Moon .................... G06V 40/19 |
| | | 382/103 |

(Continued)

FOREIGN PATENT DOCUMENTS

| CN | 109 145 864 A | 1/2019 |
| EP | 0 990 416 A1 | 4/2000 |

(Continued)

OTHER PUBLICATIONS

Cristina et al., "Gaze Tracking by Joint Head and Eye Pose Estimation Under Free Head Movement," 27th European Signal Processing Conference (EUSIPCO), pp. 1-5, 2019.

(Continued)

*Primary Examiner* — Tsung Yin Tsai
(74) *Attorney, Agent, or Firm* — Hamilton, Brook, Smith & Reynolds, P.C.

(57) ABSTRACT

A method for estimating a gaze direction of a user includes acquiring an image of a face of the user, determining an approximate gaze direction based on a current head pose and a relationship between head pose and gaze direction, determining an estimated gaze direction based on detected eye features, determining a precise gaze direction based on glint position and eye features, and combining the approximate gaze direction and at least one of the estimated gaze direction and the precise gaze direction to provide a corrected gaze direction.

14 Claims, 4 Drawing Sheets

(51) Int. Cl.
*G06V 10/30* (2022.01)
*G06V 40/18* (2022.01)

(56) References Cited

U.S. PATENT DOCUMENTS

| | | | |
|---|---|---|---|
| 9,565,392 B2* | 2/2017 | Ferren | H04L 65/403 |
| 10,173,586 B1* | 1/2019 | Kashchenko | G06F 3/017 |
| 10,475,415 B1* | 11/2019 | Gatson | G06F 3/013 |
| 10,482,677 B1* | 11/2019 | Iyer | G06F 17/16 |
| 2003/0169907 A1 | 9/2003 | Edwards et al. | |
| 2014/0055342 A1* | 2/2014 | Kamimura | G06V 40/193 |
| | | | 345/156 |
| 2016/0004303 A1* | 1/2016 | Arar | G06F 3/013 |
| | | | 345/156 |
| 2016/0170486 A1* | 6/2016 | Rydberg | G06F 3/013 |
| | | | 348/78 |
| 2016/0343138 A1 | 11/2016 | Chew | |
| 2019/0077308 A1* | 3/2019 | Kashchenko | G06F 3/012 |
| 2019/0147607 A1 | 5/2019 | Stent et al. | |
| 2019/0156100 A1* | 5/2019 | Rougeaux | G06V 40/161 |
| 2020/0019763 A1* | 1/2020 | Iyer | G06F 18/22 |
| 2020/0132474 A1* | 4/2020 | Comer | G06V 40/28 |
| 2020/0342201 A1* | 10/2020 | Wilhelm | G06V 40/19 |

FOREIGN PATENT DOCUMENTS

| | | |
|---|---|---|
| EP | 3 486 834 A1 | 5/2019 |
| JP | 2019-519859 A | 7/2019 |
| JP | 2000-113186 A | 4/2020 |
| WO | 2018/000020 A1 | 1/2018 |

OTHER PUBLICATIONS

International Search Report for International Application No. PCT/EP2020/074655 entitled "Determination of Gaze Direction," filing date Sep. 3, 2020. Date of completion: Nov. 20, 2020.
Written Opinion of the International Searching Authority for International Application No. PCT/EP2020/074655 entitled "Determination of Gaze Direction," filing date Sep. 3, 2020. Date of completion: Nov. 20, 2020.

* cited by examiner

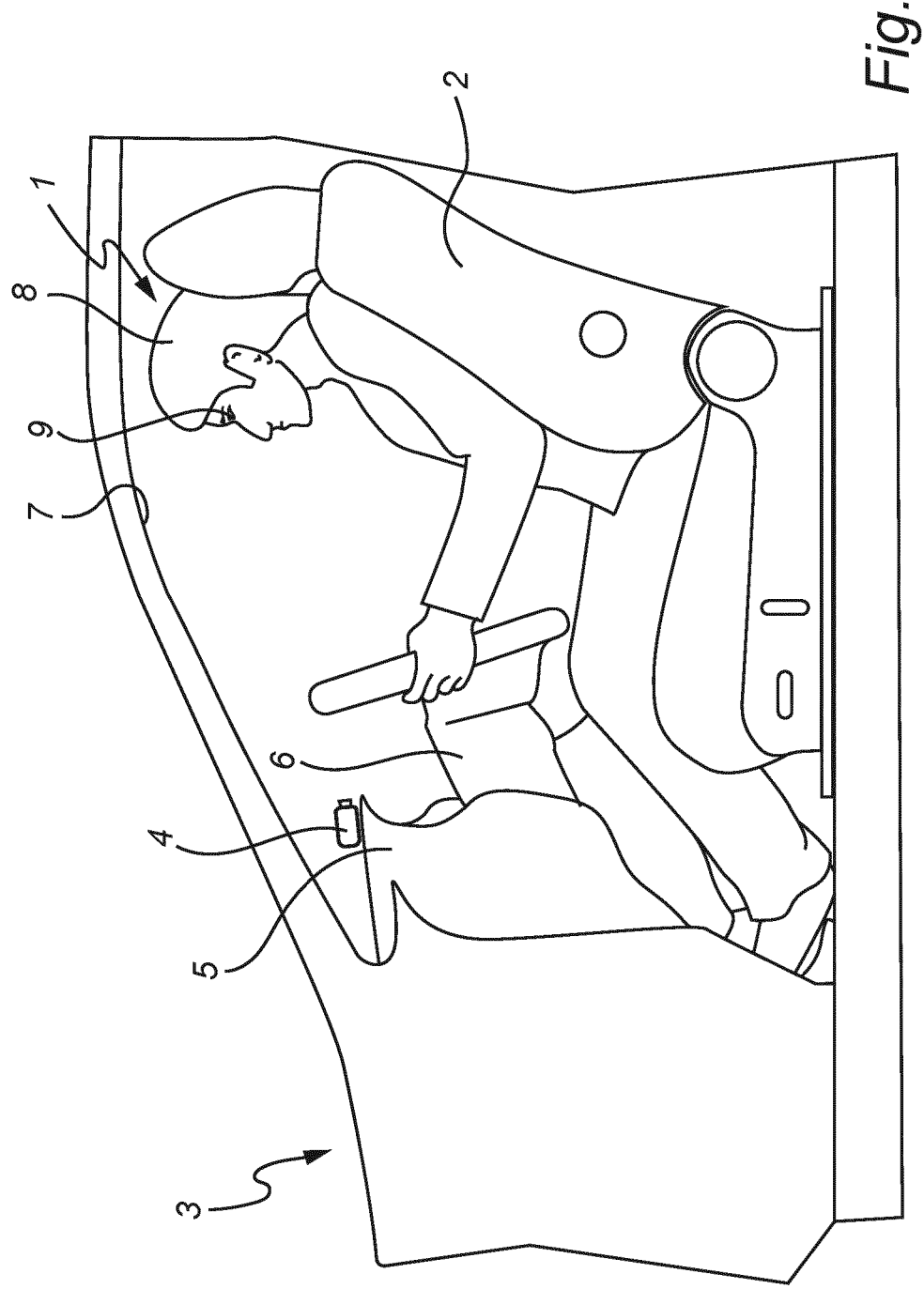

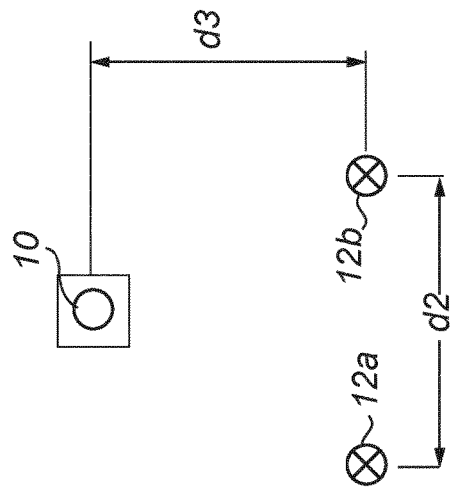
Fig. 2b
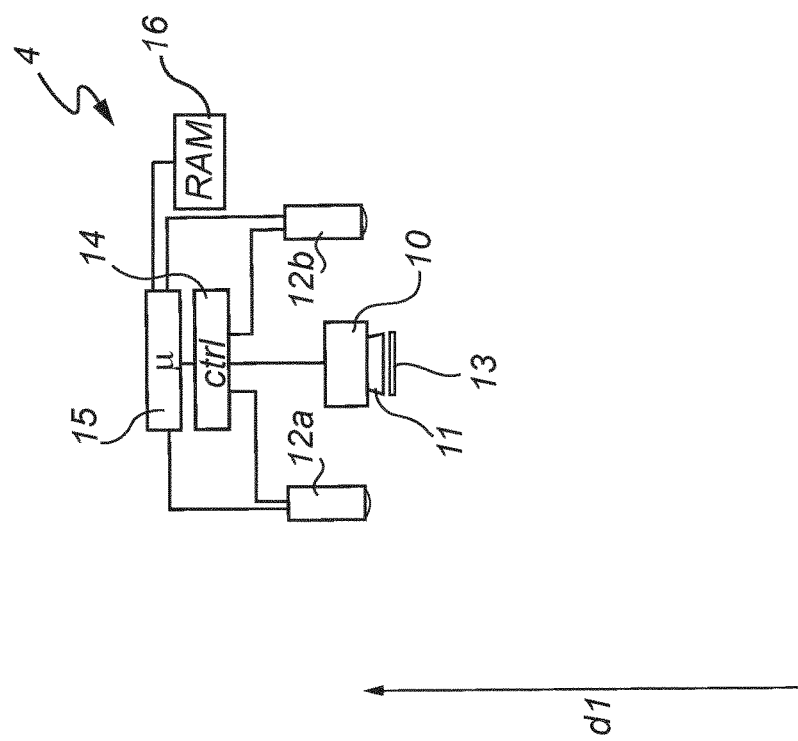
Fig. 2a

DETERMINATION OF GAZE DIRECTION

This application is the U.S. National Stage of International Application No. PCT/EP2020/074655, filed Sep. 3, 2020, which designates the U.S., published in English, and claims priority under 35 U.S.C. § 119 or 365 (c) to European Application No. 19195512.9, filed Sep. 5, 2019. The entire teachings of the above applications are incorporated herein by reference.

FIELD OF THE INVENTION

The present invention relates generally to the field of eye tracking, i.e. detecting and monitoring the eyes of a user using images of the user. Specifically, the invention relates to determining and tracking of a direction of gaze of a user, i.e. where the user is currently looking.

BACKGROUND OF THE INVENTION

The direction of gaze of a user can be determined from images acquired of the face of the use, by first determining a head pose (in a room coordinate system) and then determining an eye pose (in a head coordinate system). The eye pose may be determined based on the position of the iris with respect to the head. This type of gaze direction detection is sometimes referred to as an estimated gaze detection.

When a more accurate gaze direction is required, the face may be illuminated (e.g. by UV-light) during the image acquisition, so that the acquired images include a reflection (glint) in the cornea of the eye. Using a known geometrical relationship between the light source(s) and the image sensor, this glint can be used to make the determination of gaze direction more accurate. This type of gaze direction detection is sometimes referred to as a precise gaze detection.

Both types of gaze detection are subject to noise and drift, and some kind of on-line calibration is typically required. Various methods have been proposed, including calibration on statistical analysis of where the user can be expected to look. Especially in vehicle implementations, this approach has been found suitable, as the user typically looks at a few, easily identifiable, objects, such as rear view mirrors, dash board controls, etc.

Still, there is a need for even better calibration techniques. Additionally, the gaze direction detection methods discussed above (estimated gaze and precise gaze) both require that the user is facing the image sensor so that the pupil is captured in the image. It would be desirable to provide a gaze direction estimate also when the eyes are not in the image.

The prior art briefly mentions this problem, and even more briefly provides solutions. Document WO 2018/000020, for example, discusses to base a very approximate gaze detection only on the head pose, i.e. where the user is facing. In WO 2018/000020, the gaze direction is approximated as perpendicular to the plane of the user's face. Document US 2019/0147607 discloses a neural network based approach to gaze detection, wherein gaze may be detected also from images not including the eyes.

GENERAL DISCLOSURE OF THE INVENTION

It is an object of the present invention to mitigate the above problems, and to provide an improved gaze estimation.

According to a first aspect of the invention, this and other objects are achieved by a method for estimating a gaze direction of a user, comprising acquiring an image of a face of the user, determining a current head pose based on the image, accessing a database storing a population-based relationship between head pose and gaze direction and determining an approximate gaze direction based on the current head pose and the relationship, identifying a set of eye features in the image, and determining an estimated gaze direction based on the eye features, identifying a set of eye features and a glint in an eye in the image, and determining a precise gaze direction based on the glint position and the eye features, and weighing 1) the approximate gaze direction and at least one of 2) the estimated gaze direction and 3) the precise gaze direction using an adaptive filter, to thereby provide a corrected gaze direction.

The invention is based on the realization that an eye gaze approximation based only on head pose needs additional information to be sufficiently accurate. It is simply not sufficient to assume that the gaze direction is normal to the plane of the face.

Further, the invention is based on the realization that for a stationary user (e.g. a driver of a car, or a user of a computer, but generally any user remaining in the same place moving only his/her head) the relationship between a specific head pose and associated gaze direction is in fact surprisingly constant across the population. Therefore, it is possible to generate a database with such a relationship, and use it (e.g. as a look-up table) to determine an approximate gaze direction based on a given head pose.

The estimated gaze direction, which is acquired using identified eye features, is more accurate than the approximate gaze direction based only on head-pose. However, as the identification of eye-features becomes more difficult and uncertain (i.e. further away from the optical axis) the estimated gaze also becomes more uncertain (large standard deviation).

The precise gaze direction, which is acquired using one or two glint(s) in the eye, is even more accurate than an estimated gaze direction based only on eye features. However, as the identification of the glint becomes more difficult and uncertain (i.e. further away from the optical axis) the precise gaze also becomes more uncertain (larger standard deviation). At a certain distance from the optical axis, it is no longer possible to identify the glint in an eye, and the precise gaze direction is lost.

According to the present invention, the estimated gaze direction and/or the precise gaze direction is/are therefore combined with the approximate (head-pose based) gaze direction to provide a corrected gaze direction. For example, the approximate gaze direction and at least one of the estimated gaze direction and the precise gaze direction can be weighed using a suitable adaptive filter, such as a Kalman filter, to thereby provide the corrected gaze direction.

The Kalman filter (or similar filter) can ensure that the relative weight of the different gaze directions is adaptively adjusted based on the uncertainty (e.g. standard deviation) of these gaze directions. For example, when the precise gaze direction is stable (e.g. small standard deviation), there is no need to put much weight on an head-pose based approximation. And vice versa, when estimated and precise gaze directions are uncertain (large standard deviation) then the head-pose based approximation can get a higher weight.

It is noted that although the precise gaze direction typically has a small standard deviation close to the optical axis, this standard deviation increases with distance from the optical axis (head or yaw angle). The estimated gaze direction has a larger standard deviation than the precise gaze direction close to the optical axis, but its standard deviation does not increase as quickly as the precise gaze. The approximate gaze (based on head-pose) on the other hand, has a larger, but more constant, standard deviation, regardless of head angle.

Based on this, an approximation of the standard deviation of the respective determined gaze directions may be expressed as a function of the head angle. In other words, as the user turns away from the optical axis, the precise gaze (and estimated gaze) will have lower weight and the approximate gaze will have larger weight.

Further, noise and other imperfections may sometimes prevent a correct determination of the precise gaze direction and/or the estimated gaze direction. Also in these situations, the approximated gaze may be given a greater weight, and ensure that the corrected gaze direction is not lost and is at least approximately correct.

As the relationship (head pose→ gaze direction) is rather constant throughout the population, a satisfactory approximation can be generated without user specific data. However, the quality of the approximation is significantly improved if user specific information is used. In one embodiment, therefore, a population based relationship may be adjusted to a specific user. For example, on-line calibration based on statistical information about viewing patterns may be used. Such statistical calibration is particularly useful in a vehicle environment, where the gaze direction of a driver most of the time is restricted to a rather small set of predetermined directions.

The relationship may be expressed in all six degrees of freedom, i.e. taking as input a complete head pose including position and orientation, and returning an approximate gaze direction. However, it may be advantageous to simplify the relationship to include fewer degrees of freedom. For example, the relationship may be expressed with only two degrees of freedom, e.g. using a spherical coordinate system with two angular coordinates (yaw/head and pitch angles). In that case, information about the position of the head may be used to adjust the stored relationship.

BRIEF DESCRIPTION OF THE DRAWINGS

The present invention will be described in more detail with reference to the appended drawings, showing currently preferred embodiments of the invention.

FIG. 1 schematically shows an eye-tracking system mounted on the dashboard of a vehicle.

FIG. 2a shows the eye-tracking system in FIG. 1 in more detail.

FIG. 2b shows an example of relative positioning of camera and light sources in FIG. 2a.

DETAILED DESCRIPTION OF PREFERRED EMBODIMENTS

Figure 3:
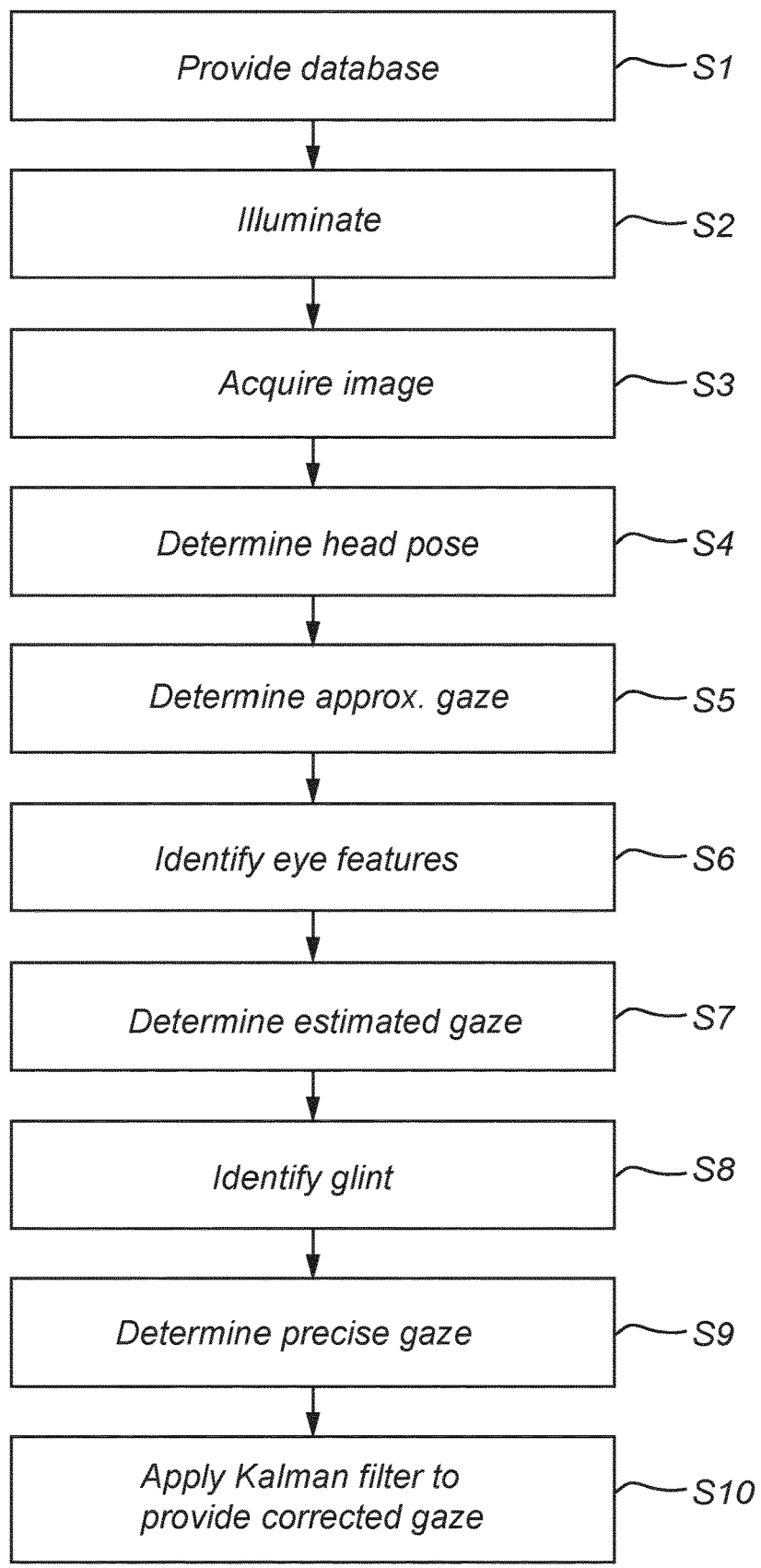
FIG. 3 is a flow chart of a method according to an embodiment of the invention.

In the following, embodiments of the invention are described in the context of a vehicle eye-tracking system. It is noted that other implementations of the present invention are also possible.

FIG. 1 shows a driver 1 sitting in a driver's seat 2 of vehicle 3. An eye-tracking system 4 is mounted in front of the driver 1, here on the dashboard 5. Alternatively, the eye-tracking system 4 may be mounted on the steering wheel column 6, or fixed to the ceiling 7. Regardless of how it is mounted, the eye-tracking system 4 should have a clear view of the driver's 1 head 8 and eyes 9. The system 4 is typically arranged at a distance $d_1$ from the driver 1 in the range from 40 cm to 120 cm, and most typically at "arm length", i.e. around 60-70 cm.

With reference to FIG. 2a, the eye tracking system 4 in the illustrated example includes an image sensor 10, e.g. a CMOS image sensor, provided with suitable optics 11. The illustrated system 4 further includes two light sources 12, typically configured to emit light outside the visible range such as infra-red (IR) or near infra-red (NIR). The light sources 12 may be solid state light sources, such as a LED. In the illustrated example, the light sources 12 are LEDs configured to emit light with a light spectrum concentrated in a 50 nm band centered around 850 or 940 nm (NIR).

In FIG. 2a, the light sources 12 are located on either side of the image sensor 10 along a straight line. In order to employ "dark-pupil" processing, a sufficient distance is required between each light source and the image sensor 10. If it is not desirable to increase the horizontal dimensions of the device, i.e. the distance d1 between the light sources, it may be advantageous to also separate the light sources 12a, 12b and the image sensor 10 by a vertical distance $d_3$, as illustrated in FIG. 2b. In other words, the light sources and the image sensor are no longer in a straight line.

Returning to FIG. 2a, the image sensor 10 is further provided with an optical band-pass filter 13, e.g. an interference filter. The filter 13 may be configured to have a pass-band substantially corresponding to the light emission spectrum of the light sources 12a, 12b. So, in the above mentioned example, the filter 13 should have a pass-band of around 825-875 nm, or 915-965 nm. The combination of narrow band illumination and narrow pass-band filtering makes the image acquisition system less sensitive to surrounding light, e.g. sunlight.

An image acquisition controller 14, henceforth referred to as the "controller" for brevity, is connected to the image sensor 10 and the light sources 12a, 12b, and is programmed to control the image sensor 10 to acquire images under illumination of the light sources 12a, 12b. Typically, in order to save energy and power consumption, the light sources 12a, 12b are controlled to emit light only when the electronic shutter of the image sensor is open. The light sources 12a, 12b may be activated alternatingly (consecutive image frames acquired illuminated by different light sources), or they may both be activated for each image frame. By using alternating illumination, disturbing reflexes (e.g. from glasses) may be suppressed in the images, as disclosed in EP 1 349 487.

As a practical example, the light sources 12a, 12b are triggered by pulses which have a duty cycle selected to provide sufficient illumination for acquiring one image frame. As mentioned, either one or both light sources may be activated for each frame. Preferably, the light sources 12a, 12b are controlled by a pulsed signal with a duty cycle to ensure that the pulse width corresponds to the time required for the image sensor 10 to acquire one image. The image sensor 10 is then synchronized with this pulsed signal.

The eye tracking system 4 further comprises processing circuitry 15 connected to receive images 16 acquired by the image sensor 10, and to process these images. The processing circuitry 15 may be integrated with the controller 14 or may be separate from the controller 14. The system also has a memory, such as a RAM memory, e.g. storing software to be executed by the processing circuitry 15.

In use, the eye tracking system 4 is arranged to acquire images of a target area of the face 9 of the user 1. The processing circuitry 15 is configured to use images from sensor 10 to track the position of the head of the user and movement of the eyes, in order to acquire various information. Specifically, the processing circuitry 15 is here programmed to obtain the direction of gaze of the user.

The direction of gaze can be determined based on acquired images, by determining a head pose, i.e. a location and orientation of a head coordinate system 20 in space, and then a relative eye pose, i.e. location and orientation of an eye coordinate system 21 in relation to the coordinate system 20. Without illumination, the eye pose can be determined based on the position of the iris with respect to the head. This approach to determining a gaze direction is normally referred to as estimated gaze.

The gaze direction can also be determined using the light sources 12a, 12b to cause a reflection (glint) in the cornea of the eye. If the position of the light source relative the image sensor is known, the position of the glint will enable determination of the gaze direction. This approach to determining a gaze direction is normally referred to as precise gaze. Some eye-tracking systems have two or more light sources, thereby enabling acquisition of images with different illumination, and thus differently located glints.

FIG. 3 shows a method according to an embodiment of the present invention. First, in step 1, and before the eye tracking actually begins, a relationship between head-pose and eye gaze direction for a population is determined and stored in a database in memory 16. Such a relationship may be obtained by collecting data from a sample of people. The relationship can be stored in various ways, but in a practical example the relationship assumes a fixed head position in space, and relates a head-pose orientation in two degrees of freedom (essentially where the nose is pointing) to a corresponding gaze direction (i.e. where the eyes are looking). Or, expressed differently, for every head-pose orientation, a correction vector to arrive at the gaze direction.

The actual gaze determination starts in step S2, with the illumination of the head 8 and eyes 9 of the user 1. Then in step S3, an image of the head 8, including the eyes 9 is acquired. In step S4, the head pose of the user is determined, based on identified facial features in a process known per se.

Using the relationship stored in memory 16, an approximate gaze direction is determined in step S5, using the determined head pose. It is noted that in some situations, this very rough approximation of the gaze direction may be the only available approximation.

Figure 4:
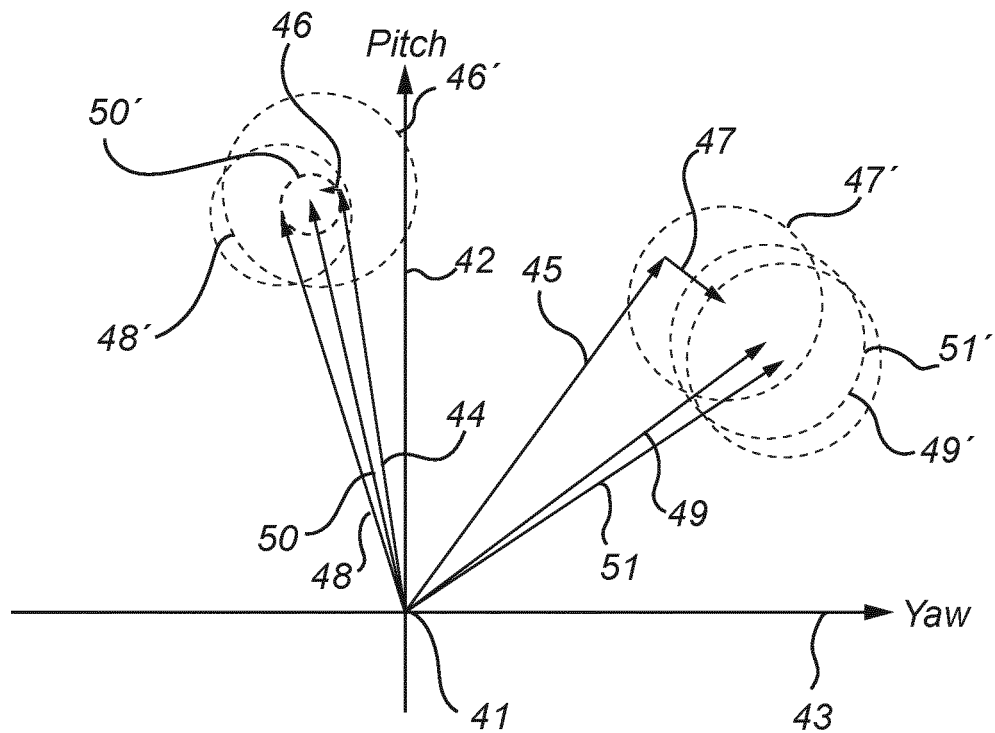
FIG. 4 is an illustration of a spherical coordinate system centered in the face of a user.

FIG. 4 shows a spherical coordinate system where the origin 41 represents the position of the head of the user 1, and the two axis 42, 43 represent pitch angle and yaw/head angle, respectively. Two different head-pose directions are indicated in FIG. 4, as arrows (vectors) 44 and 45. The relationship in the memory 16 provides a correction vector 46, 47 for each head-pose direction, also indicated in FIG. 4. The end of vectors 46, 47 thus represents an approximate gaze, based only on the head-pose and the previously stored relationship.

Then, in step S6, relevant eye features, such as iris position, are identified, to enable a determination of an estimated gaze in step S7. In FIG. 4, vectors 48 and 49 represent the estimated gaze corresponding to the approximate gaze represented by the combined vectors 44, 46 and 45, 47, respectively.

Continuing to step S8, a glint, i.e. a reflection of the illumination in the cornea of the eye, is identified (if possible), and in step S9 a precise gaze is determined using the identified glint. In FIG. 4, vectors 50 and 51 represent the precise gaze corresponding to the approximate gaze represented by the combined vectors 44, 46 and 45, 47, respectively.

Finally, using the various gaze directions determined in steps S5, S7 and S9, i.e. approximate gaze, estimate gaze and precise gaze, a corrected gaze direction is determined in step S10 by using a Kalman filter (or other similar adaptive weighting filter).

Figure 5:
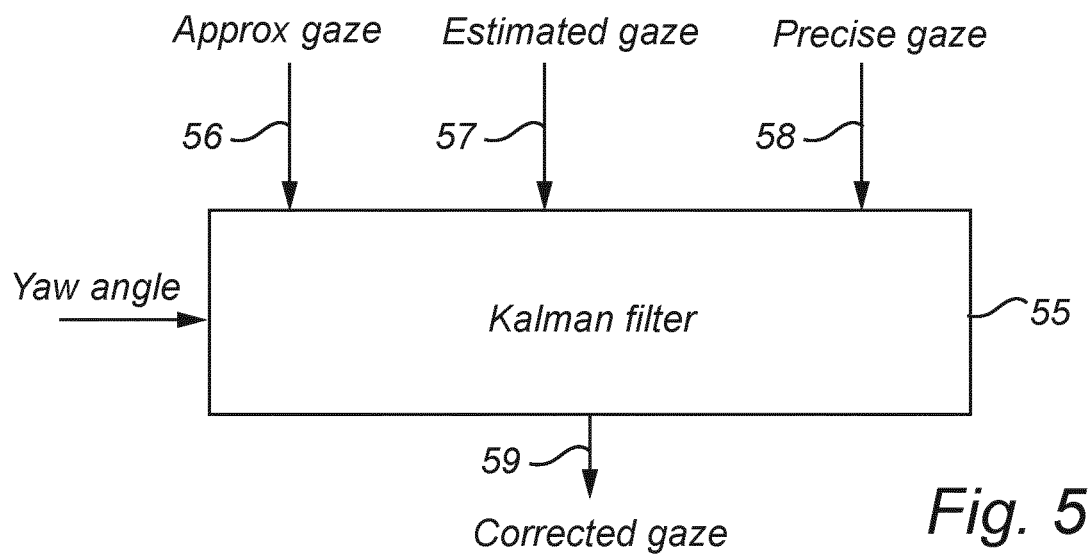
FIG. 5 is a schematic block diagram of an embodiment of the invention.

A schematic illustration of the operation of the Kalman filter 55 is shown in FIG. 5. The filter 55 receives as input one, two or three different eye gaze directions, i.e. the approximate gaze 56, the estimated gaze direction 57 (if available), and the precise gaze direction 58 (also if available).

The filter also receives, for each gaze direction, a variable value indicative of the standard deviation of the particular gaze direction. So, one value for the approximate gaze, one value for the estimated gaze, and one value for the precise gaze. In one embodiment, the system is configured to determine an estimation of the standard deviation for each determined gaze direction. However, in a more practical example, the system makes an assumption that the standard deviation of a particular gaze direction is related to the yaw/head angle 43. This information may be provided as input to the Kalman filter 55, as indicated in FIG. 5.

Returning to FIG. 4, the estimated standard deviation of each respective gaze direction has been indicated by dashed circles 46', 47', 48', 49', 50' and 51'. Circle 48' represents the standard deviation of gaze direction 48, etc.

To the left of, and close to, axis 42, is the approximate gaze indicated by vectors 44, 46, with a standard deviation 46'. The corresponding estimated gaze 48 has a significantly smaller standard deviation 48', and the corresponding precise gaze 50 has an even smaller standard deviation 50'. This corresponds to the situation that when the user's gaze is close to the central axis 42 (yaw/head angle close to zero), the glint is clearly detectable and the precise gaze is relatively reliable (small standard deviation). As a result, the precise gaze will be given a high weight, and the output 59 from the Kalman filter 55 will be very close to the precise gaze 58.

If, however, noise or some interference (e.g. sudden burst of sun-light) causes the glint to be undetectable in one or several frames, the Kalman filter 55 may rely on the remaining gaze directions 56 and 57, thereby still providing a relatively correct output 59.

Noise or interference may also cause a sudden shift in the precise gaze 58. Such sudden shift may be interpreted by the system as an unreliable determination (large standard deviation) thus again leading to a corrected gaze 59 based primarily on the approximate and estimated gaze 56, 57.

Turning to the right side of FIG. 4, is the approximate gaze indicated by vectors 45, 47, with a standard deviation 47'. The corresponding estimated gaze 49 has a similar size standard deviation 49', and the corresponding precise gaze 50 also has a similar size standard deviation 51'. This corresponds to the situation that when the user's gaze is further from the central axis 42 (yaw/head angle far from zero), both the estimated gaze determination and the precise gaze determination becomes less accurate and less reliable (large standard deviation). As a result, the approximate gaze 56, the estimated gaze 57 and the precise gaze 58 will all be given similar weights in the Kalman filter 55, and the corrected gaze 59 will be based on all three inputs 56, 57, 58.

The person skilled in the art realizes that the present invention by no means is limited to the preferred embodiments described above. On the contrary, many modifications and variations are possible within the scope of the appended claims. Specifically, the details of the eye tracking system disclosed herein serves only as an example, and does not restrict the application of the present invention directed to combination of gaze directions determined with different methods. Further, weighing of the different gaze directions may not require an adaptive filter, and a different type of adaptive filter may be used instead of a Kalman filter.

The invention claimed is:

1. A method for estimating a gaze direction of a user, comprising:
   acquiring an image of a face of the user,
   determining a current head pose based on the image of the face of the user, accessing a database storing a population-based relationship between head pose and gaze direction and determining an approximate gaze direction based on said current head pose and said relationship,
   identifying a set of eye features in said image, and determining an estimated gaze direction based on said eye features,
   identifying a set of eye features and a glint in an eye in said image, and determining a precise gaze direction based on said glint position and said eye features, and
   combining said approximate gaze direction and at least one of said estimated gaze direction and said precise gaze direction to provide a corrected gaze direction.

2. The method according to claim 1, wherein said approximate gaze direction and at least one of said estimated gaze direction and said precise gaze direction are weighed using an adaptive filter.

3. The method according to claim 2, wherein the relative weights of the approximate gaze direction, estimated gaze direction and precise gaze direction are adaptively adjusted based on a standard deviation of the approximate gaze direction, estimated gaze direction and precise gaze direction, respectively.

4. The method according to claim 3, wherein an approximation of the standard deviation of the respective determined gaze directions is expressed as a function of a yaw angle.

5. The method according to claim 4, wherein the adaptive filter is a Kalman filter.

6. The method according to claim 1, further comprising illuminating the face of the user during acquisition of said image.

7. The method according to claim 1, further comprising adjusting the population-based relationship to a specific user using on-line calibration.

8. The method according to claim 7, wherein said on-line calibration is based on statistical information about viewing patterns.

9. The method according to claim 1, wherein said population-based relationship is expressed in two dimensions of a spherical coordinate system, e.g. yaw and pitch angular coordinates.

10. A system for estimating a gaze direction of a user, comprising:
    an image sensor for acquiring an image of a face of the user, and
    processing circuitry configured to:
    determine a current head pose based on an acquired image of the face of the user, accessing a database storing a population-based relationship between head pose and gaze direction and determining an approximate gaze direction based on said current head pose and said relationship,
    identify a set of eye features in said image, and determining an estimated gaze direction based on said eye features,
    identify a set of eye features and a glint in an eye in said image, and determining a precise gaze direction based on said glint position and said eye features, and
    combine said approximate gaze direction and at least one of said estimated gaze direction and said precise gaze direction to provide a corrected gaze direction.

11. The system according to claim 10, further comprising one or several light sources for illuminating the face of the user during acquisition of said image.

12. The system according to claim 10, wherein said processing circuitry implements an adaptive filter to weigh said approximate gaze direction with at least one of said estimated gaze direction and said precise gaze direction.

13. The system according to claim 12, wherein the adaptive filter is a Kalman filter.

14. The method according to claim 2, wherein the adaptive filter is a Kalman filter.

* * * * *